United States Patent [19]

Cheek et al.

[11] 3,807,249
[45] Apr. 30, 1974

[54] DRIVE DISCONNECT DEVICE
[75] Inventors: Michael E. Cheek, Oswego; Thomas P. Muller, Aurora, both of Ill.
[73] Assignee: Caterpillar Tractor Co., Peoria, Ill.
[22] Filed: Dec. 4, 1972
[21] Appl. No.: 311,823

[52] U.S. Cl. ................................................. 74/405
[51] Int. Cl. ........................................... F16h 57/00
[58] Field of Search ......................... 74/405; 192/67

[56] References Cited
UNITED STATES PATENTS
3,504,563  4/1970  Polak ................................... 74/405
3,504,564  4/1970  Kell ..................................... 74/405

Primary Examiner—Leonard H. Gerin
Attorney, Agent, or Firm—Ralph E. Walters

[57] ABSTRACT

A drive disconnect device for a power train includes a pair of rotatable members disposed for relative axial movement between coupled and uncoupled positions and an actuator mechanism mounted on one of the rotatable members for selective engagement with the other rotatable member to move the members to their coupled position for unitary rotation of the members with the actuator mechanism and the actuator mechanism being effective to move the rotatable members to the uncoupled position to permit unrestricted relative rotation therebetween.

12 Claims, 3 Drawing Figures

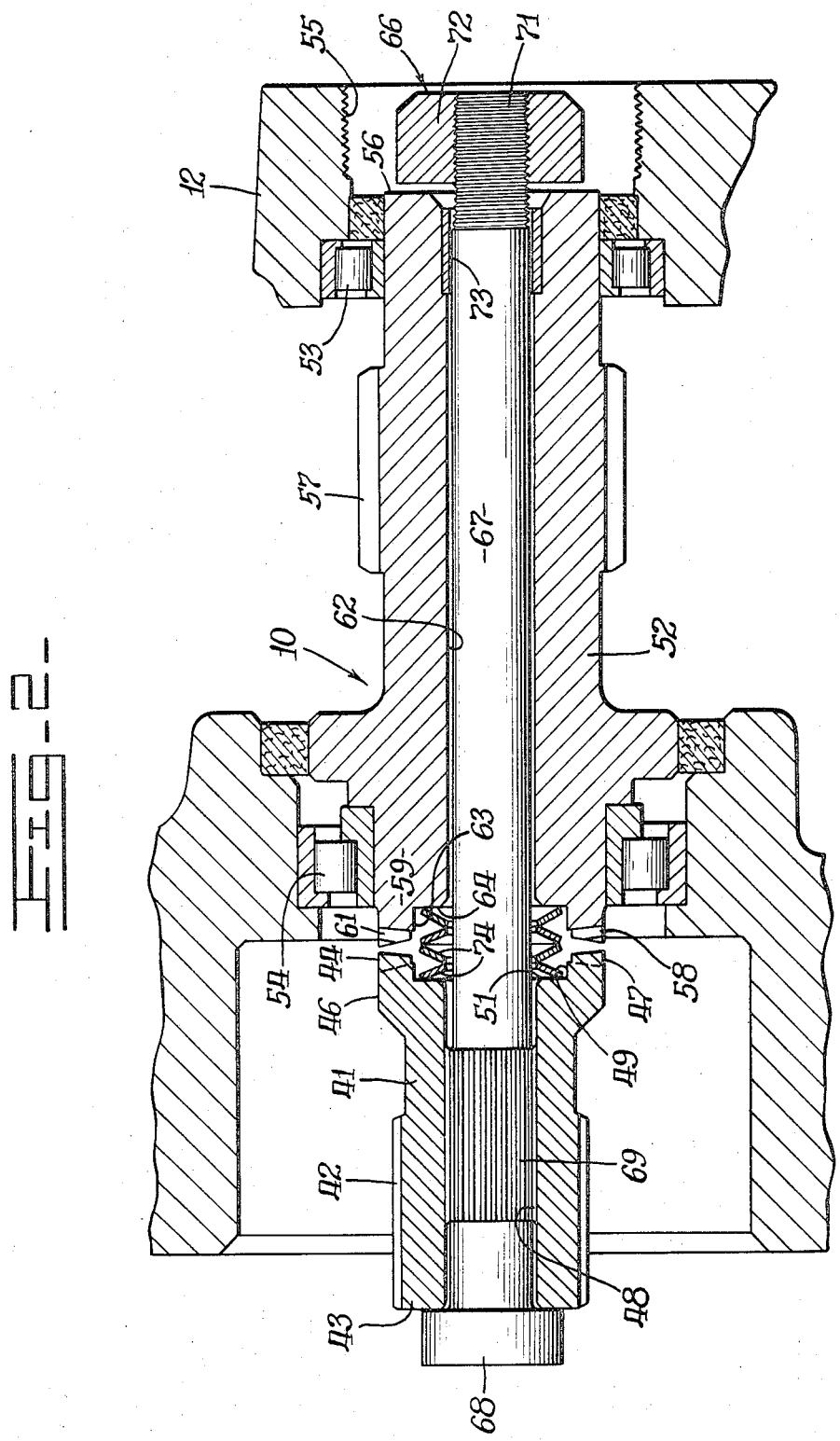

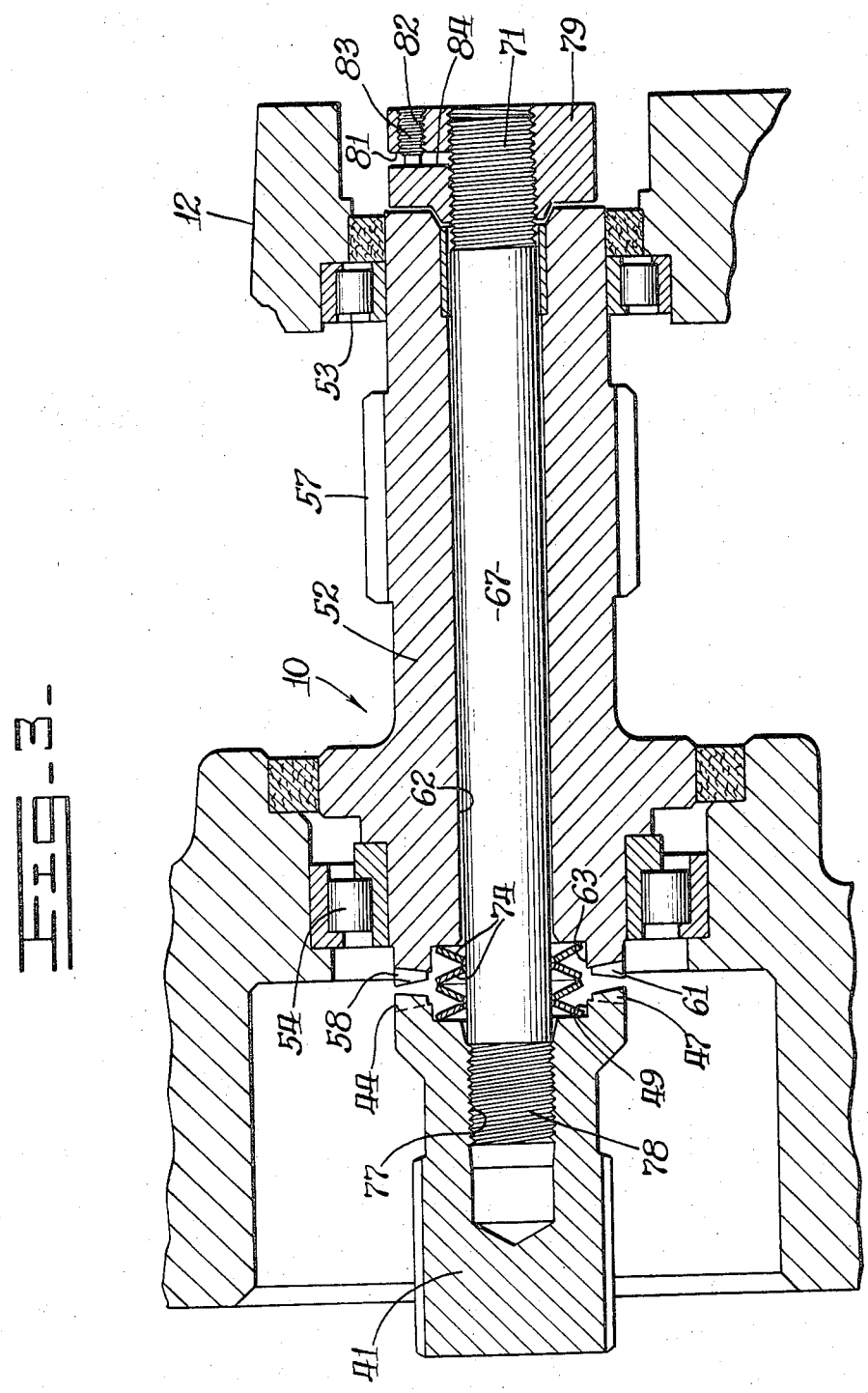

DRIVE DISCONNECT DEVICE

BACKGROUND OF THE INVENTION

Vehicles in which a failure in the power train or some other major component occurs must frequently be towed to repair facilities for servicing. The clutches of such disabled vehicles are normally disengaged during such towing operations to disconnect the power train from the power plant. However, some vehicles have hydrostatically driven power trains which include a final drive powered by a hydraulic motor and are not provided with clutches. Towing such vehicles with an inoperative power plant forceably drives the hydraulic motor and can result in severe damage thereto due to lubricant starvation and friction of the rotating components.

Furthermore, a normally spring applied and hydraulically released brake unit is commonly integrated with the final drive system for reasons of safety. In such brake-equipped vehicles, failure of the power plant or related auxiliary equipment, such as the hydraulic system, prevents the hydraulic release of the brake so that special mechanical provisions are required for their release before towing can commence.

A solution to these problems is to provide a mechanism which permits selective decoupling of the final drive from the hydraulic motor and brake of such vehicles. Such mechanisms are taught by the constructions disclosed in U.S. Pat. Application Ser. No. 211,368, filed on Dec. 23, 1971 by Blomstrom et al., and in U.S. Pat. No. 3,744,311 to S. I. Caldwell, both of which are assigned to the assignee of the present application, and in U.S. Pat. Nos. 3,504,563 to Polak and 3,504,564 to Kell.

Heretofore, the forces of the actuators of such mechanisms react against a final drive housing or other final drive components thereby adding to the complexity of such mechanisms. Another problem associated with any such known mechanisms is that they utilize an axial spline type connection which requires a considerable length of intermeshing engagement to provide sufficient torque capacity. Consequently, the actuator mechanism must move one of the coupling members a distance equal to the length of the engagement and additional dead space must be provided in the final drive housing for such movement.

OBJECTS OF THE INVENTION

Accordingly, an object of this invention is to provide an improved drive disconnect device which permits the output portion of a power train to be selectively uncoupled from the input portion.

Another object of this invention is to provide an improved drive disconnect device for uncoupling two normally coupled members of a power train to permit the output portion to rotate freely without imparting rotary motion to the power train component on the input side of the disconnect device.

Another object of this invention is to provide an improved drive disconnect device of unitary construction wherein the reactionary forces of the actuator mechanism are contained within the members of the drive disconnect device.

Other objects and advantages of the present invention will become more readily apparent upon reference to the accompanying drawings and following description.

BRIEF DESCRIPTION OF THE DRAWINGS

FIG. 2 is an enlarged transverse section through the drive disconnect device of FIG. 1 illustrating the uncoupled condition of the device.

FIG. 3 is a transverse sectional view of an alternate embodiment of the drive disconnect device.

DESCRIPTION OF THE PREFERRED EMBODIMENTS

Figure 1:
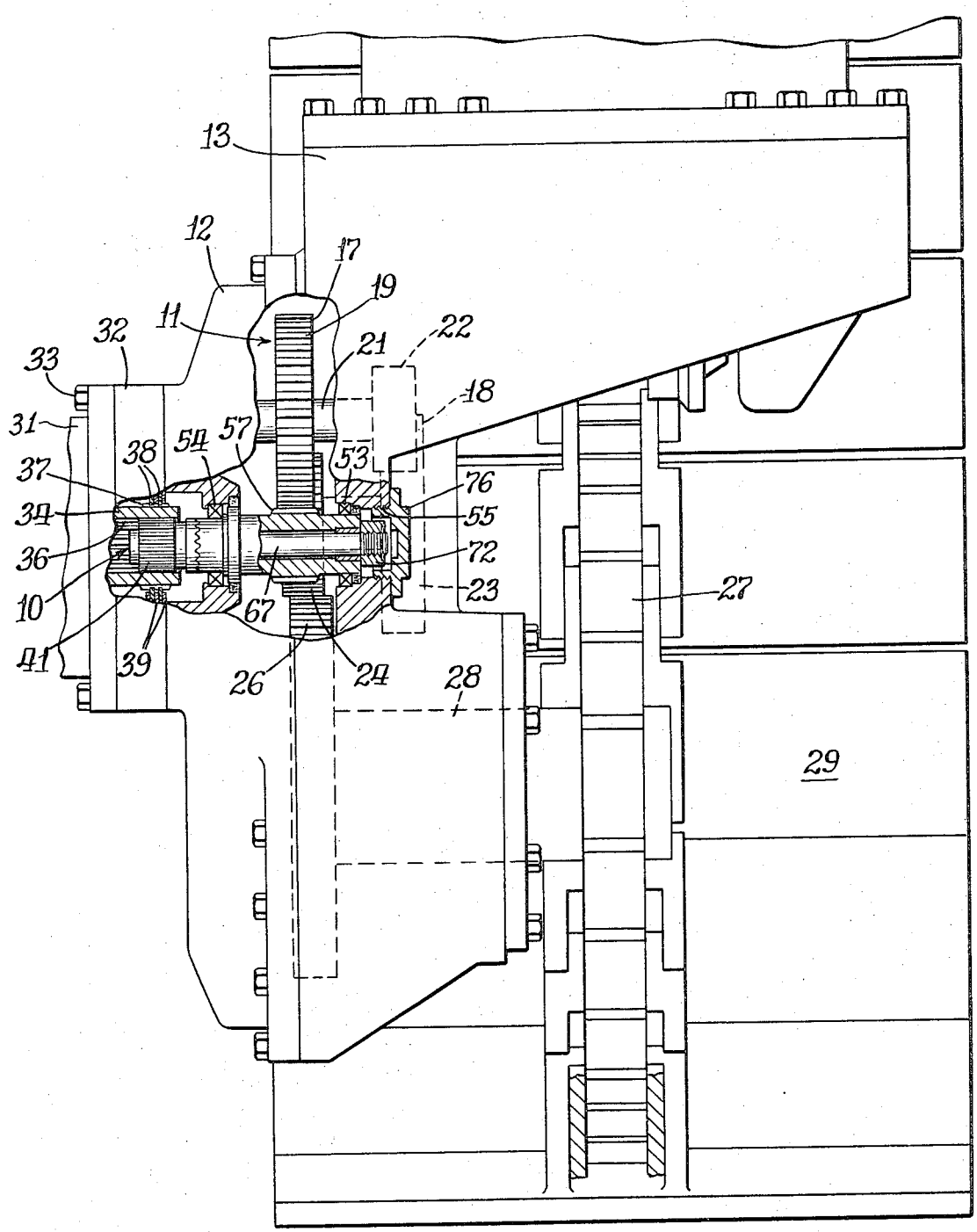
FIG. 1 is a plan view, partially in section, of a drive disconnect device embodying the principles of the present invention associated with a final drive of a vehicle.

Referring more particularly to the drawings, a drive disconnect device embodying the principles of the present invention is generally indicated by the reference numeral 10 in association with a final drive gear train generally indicated at 11. The final drive is disposed within a housing 12 rigidly secured to a forwardly directed track roller frame 13 of a track-type undercarriage 14 of an earthmoving vehicle, not shown. The final drive gear train includes a pair of cluster gears 17 and 18 both of which are rotatably supported upon suitable bearings disposed within the housing. The cluster gear 17 includes a large gear 19, a stem portion 21 and a small gear 22 which is, in turn, meshed with a large gear 23 of the cluster gear 18. A small gear 24 of the cluster gear 18 is in mesh with a large diameter gear 26 which is drivingly connected to a sprocket 27 through a drive shaft 28. Rotation of the sprocket causes movement of the vehicle on a track assembly 29 engaged by the teeth of the sprocket in the usual manner.

A hydrostatically driven motor 31 and a brake assembly 32 are secured in end-to-end relation to the inboard side of the housing 12 by a plurality of bolts 33. The motor 31 provides the input power to the final drive 11 through rotation of an input sleeve 34 and the drive disconnect device 10. The input sleeve is provided with a splined bore 36 and an external spline 37.

The brake assembly 32 is a disc type brake which is spring engaged and hydraulically released. The brake includes a plurality of rotatable discs 38 which are spline connected to the external spline 37 of the input sleeve 34. A plurality of non-rotatable discs 39 are alternately interleaved with the rotatable discs and cooperate therewith for holding the input sleeve stationary when the brake is engaged. Hydraulic release of the brake permits free rotation of the rotatable discs and the input sleeve.

As best shown in FIG. 2, the drive disconnect device 10 includes a driving input shaft 41 having an external spline 42 formed on an end 43 thereof and slidably disposed within the splined bore 36 of the input sleeve 34 as shown in FIG. 1. A first face gear 44 is formed on an opposite end 46 of the input shaft and has a plurality of teeth 47. A splined bore 48 extends axially through the input shaft. An annular recess 49 extends axially inwardly from the end 46 and terminates in an annular shoulder 51.

A driven output shaft 52 is disposed in axially aligned end-to-end relation with the input shaft 41 and is rotatably supported upon a pair of bearings 53 and 54 suitably disposed within the housing 12. The housing has a threaded bore 55 formed therein and an end face 56 of the output shaft extends into the threaded bore. A spur gear 57 is formed on the circumference of the output shaft and is in constant mesh with the large gear 19 of the cluster gear 17 of the final drive 11. A second face gear 58 is formed on an end 59 of the output shaft and is located adjacent to the first face gear 44 of the input shaft. The second face gear includes a plurality of teeth 61 adapted for meshing engagement with the teeth 47 of the first face gear. A bore 62 is formed axially through the output shaft. The end 59 of the output shaft is provided with an annular recess 63 which terminates in an annular shoulder 64.

An actuator mechanism 66 is provided for axially translating the input shaft 41 relative to the output shaft 52 for selectively coupling and uncoupling the teeth 47 and 61 of the first and second face gears 44 and 58, respectively. The actuator mechanism includes a tie rod 67 extending through the splined bore 48 of the input shaft and the bore 62 of the output shaft 52. The tie rod is provided with a head portion 68 formed on one end thereof with the head portion adapted for abutting engagement with the end 43 of the input shaft. An external spline 69 is formed on the tie rod adjacent to the head portion and mates with the splined bore of the input shaft to prevent relative rotation therebetween. The opposite end of the tie rod is provided with a threaded portion 71 which extends outwardly beyond the end face 56 of the output shaft. A locknut 72 is screw-threadably mounted on the threaded portion 71 of the tie rod 67 and is adapted for selective abutment with the end face 56 of the output shaft. The locknut is of the type which is maintained in a selected position by frictional contact between the threads of the locknut and the tie rod. A sleeve bearing 73 is coaxially disposed within the bore 62 of the output shaft adjacent to the end face 56 rotatably to support the tie rod 67 when the face gears are in the uncoupled condition.

The actuator mechanism includes a plurality of conical springs 74 disposed in the annular recesses 49 and 63 of the input and output shafts 41 and 52, respectively. The springs seat against the shoulders 51 and 64 and are in a compressed or preloaded state when the drive disconnect device is in the coupled condition. The springs resiliently urge the input shaft away from the output shaft to uncouple the disconnect device when the lock nut 72 is rotated to a position spaced from the end face 56 of the output shaft.

A removable plug 76 is normally screw-threadably disposed within the threaded bore 55 of the housing 12 to exclude the entrance of dirt, water and foreign matter into the housing 12. Removal of the plug provides access to the locknut 72.

An alternate embodiment of a drive disconnect device of the present invention is disclosed in FIG. 3. It is noted that the same reference numerals are used to designate similarly constructed counterpart elements of the first embodiment. In this embodiment, however, the input shaft 41 has a threaded bore 77 extending axially inwardly from the end 46 thereof. The tie tod 67 has a threaded end portion 78 screwed into the threaded bore 77 of the input shaft to rigidly fix the tie rod thereto. A nut 79 threaded onto the threaded portion 71 of the tie rod 67 has a slot 81 formed therein substantially normal to the longitudinal axis of the tie rod. A threaded hole 82 extends between the outer end of the nut and the slot and receives a setscrew 83. Rotating the screw so that the end thereof abuts an inner face 84 of the slot spreads the slot to wedge the threads of the nut against the threads of the tie rod and permits the nut to be locked in a selected position.

OPERATION

While the operation of the present invention is believed clearly apparent from the foregoing description, further amplification will subsequently be made in the following brief summary of such operation. During normal vehicle operation, the drive disconnect device 10 is maintained in the coupled condition wherein the teeth 47 of the first face gear 44 on the input shaft 41 are intermeshed in driving relation to the teeth 61 of the second face gear 58 of the output shaft 52. The intermeshed condition of the face gears is obtained by rotating locknut 72 in a first direction to a first position in abutment with the end face 56 of the output shaft to translate the input shaft axially toward the output shaft to engage the face gears. The interaction of the locknut and tie rod 67 retains the face gears in the intermeshed driving condition. Thus, the input shaft, output shaft and actuator mechanism rotate as a unit and power from the hydraulic motor 31 is transmitted through the input sleeve 34 and the drive disconnect device to the final drive gears which power the sprocket and track assembly. It is significant that the actuator mechanism rotates with the shafts rather than being non-rotatably mounted on the final drive housing or other final drive components thereby eliminating the need for complex and expensive couplings for connecting the actuator mechanism to the rotatable disengageable element of the disconnect device.

Should a failure occur in the engine or other major component and it becomes necessary to tow the vehicle to a service facility, the drive disconnect device 10 is uncoupled to prevent the final drive 11 from imparting rotation to the input sleeve 34, brake assembly 32, and hydraulic motor 31. This is accomplished by removing the protective plug 76 and rotating the locknut 72 in a direction opposite from the first direction permitting the bias of the conical springs 74 to separate the input shaft from the output shaft so that the teeth of the first face gear are in non-driving relation to the teeth of the second face gear. Rotation of the locknut is continued until the springs become completely relaxed and the locknut reaches a second predetermined position spaced from the end face 56 of the output shaft. Separation of the face gears permits unrestricted relative rotation between the input and the output shafts so that the final drive may rotate freely without imparting rotary motion to the brake assembly and hydraulic motor.

In view of the foregoing, it is readily apparent that the structure of the present invention provides an improved drive disconnect device for decoupling a driven output shaft from a driving input shaft to permit the output portion to rotate freely without imparting rotary motion to the power train components on the input side of the drive disconnect device. With the described face-type coupling drive between the input and output shafts, only a minimum of axial relative movement between the shafts is required for engaging or disengaging the face gears. The disconnect device is a selfcontained unit with the reactionary forces of the actuation mechanism taken entirely through the components of the disconnect device.

While the invention has been described and shown with particular reference to the preferred embodiment, it will be apparent that variations might be possible that would fall within the scope of the present invention which is not intended to be limited except as defined in the following claims.

What is claimed is:

1. A drive disconnect device for a power train comprising;
   a pair of rotatable members adapted for relative axial movement between coupled and uncoupled positions; and
   actuating means mounted on one of said rotatable members in non-removable relation during operation and being selectively positionable in facing thrust transferring engagement with the other of said rotatable members to move the members to said coupled position for unitary rotation of the rotatable members and said actuating means at the same speed, said actuating means also being effective upon selective manipulation to a position spaced from said other of said rotatable members to permit movement of the rotatable members to said uncoupled position and unrestricted relative rotation between the rotatable members.

2. The drive disconnect device of claim 1 wherein said other of said rotatable members is hollow; said actuating means includes a tie rod having opposite ends and extending through said other rotatable member with one of said ends being fixed to said one of said rotatable members; and force transmitting means secured to the other of said ends of said tie rod for actuation to a first position in engagement with said other rotatable member to move the rotatable members in one direction to said coupled position and being actuatable to a second position spaced from said other rotatable member to permit the translation of the rotatable members in an opposite direction from said one direction to said uncoupled position.

3. The drive disconnect device of claim 2 wherein said actuating means includes spring means disposed between said rotatable members for moving the rotatable members in said opposite direction when said force transmitting means is actuated to said second position.

4. The drive disconnect device of claim 2 wherein said one rotatable member has a first face gear formed thereon and said other rotatable member has a second face gear formed thereon, said face gears being adapted for intermeshing engagement when said rotatable members are in said coupled position.

5. The drive disconnect device of claim 4 wherein said force transmitting means is a locknut threadably secured to said other end of said tie rod.

6. A drive disconnect device, for selectively uncoupling a vehicle final drive from a hydrostatically driven motor, comprising;
   a hollow driven output shaft drivingly connected to such a final drive and having a first drive means formed thereon;
   a driving input shaft operatively connected to such a motor and having a second drive means formed thereon and disposed in juxtaposition to said first drive means, said input shaft being axially translatable between a first position wherein the first and second drive means are intermeshingly engaged in driving relation and a second position wherein the first and second drive means are disengaged in non-driving relation; and
   actuating means mounted on said input shaft in non-removable relation during operation and being selectively positionable in facing thrust transmitting engagement with said output shaft to move said input shaft to said first position for unitary rotation of the shafts and the actuating means at the same speed, said actuating means also being effective upon selective manipulation to a position spaced from said output shaft to permit movement of the input shaft to said second position and unrestricted relative rotation between the input and output shafts.

7. The drive disconnect device of claim 6 wherein said actuating means includes a tie rod extending through said output shaft and having opposite ends with one of said ends being fixed to said input shaft, and a nut threadably secured to the other end of said tie rod, said nut being rotatable to a first position in abutment with said output shaft to move said input shaft in one direction to said first position and rotatable to a second position spaced from said output shaft to permit the translation of said input shaft in an opposite direction to said second position.

8. The drive disconnect device of claim 7 wherein said actuating means includes a spring disposed between said input shaft and said output shaft for urging said input shaft in said opposite direction when said nut is rotated to said second position.

9. The drive disconnect device of claim 8 wherein said input shaft has an internal spline and wherein said one end of said tie rod has an external spline mated with said internal spline of said input shaft, said one end of said tie rod having an enlarged head portion adapted for unidirectional axial force transmitting contact with said input shaft.

10. The drive disconnect device of claim 9 wherein said nut is maintained in a preselected position by frictional contact between the nut and the tie rod.

11. The drive disconnect device of claim 9 wherein said nut includes a releasable locking device for selectively locking said nut in a preselected position.

12. The drive disconnect device of claim 8 including a threaded connection for fixing said one end of said tie rod to said input shaft, and said nut including a releasable locking device for selectively locking said nut in a preselected position.

* * * * *